United States Patent
Bruck et al.

(10) Patent No.: US 9,017,596 B2
(45) Date of Patent: Apr. 28, 2015

(54) SLAG REMOVAL APPARATUS AND METHOD

(71) Applicants: Gerald J. Bruck, Oviedo, FL (US); Ahmed Kamel, Orlando, FL (US)

(72) Inventors: Gerald J. Bruck, Oviedo, FL (US); Ahmed Kamel, Orlando, FL (US)

(73) Assignee: Siemens Energy, Inc., Orlando, FL (US)

( * ) Notice: Subject to any disclaimer, the term of this patent is extended or adjusted under 35 U.S.C. 154(b) by 156 days.

(21) Appl. No.: 13/755,157

(22) Filed: Jan. 31, 2013

(65) Prior Publication Data
US 2014/0212594 A1    Jul. 31, 2014

(51) Int. Cl.
*B23K 37/00* (2006.01)
*B05C 21/00* (2006.01)
*B22F 3/105* (2006.01)
*C21B 3/04* (2006.01)
*B29C 67/00* (2006.01)

(52) U.S. Cl.
CPC ............. *B23K 37/00* (2013.01); *B05C 21/00* (2013.01); *B22F 3/1055* (2013.01); *C21B 3/04* (2013.01); *B29C 67/0077* (2013.01); *B29C 67/0096* (2013.01)

(58) Field of Classification Search
CPC ....................................................... B23K 37/00
USPC ........................................... 266/44, 230, 227
See application file for complete search history.

(56) References Cited

U.S. PATENT DOCUMENTS

| | | |
|---|---|---|
| 3,360,254 A | 12/1967 | Hellmund |
| 4,111,159 A | 9/1978 | Okuno et al. |
| 4,425,254 A | 1/1984 | Langhoff et al. |
| 4,455,222 A * | 6/1984 | Less ........................... 209/235 |
| 7,431,776 B2 | 10/2008 | Creel, Jr. et al. |
| 2002/0053307 A1* | 5/2002 | Ishiwata et al. ............. 110/341 |
| 2011/0274580 A1* | 11/2011 | Deegan et al. .............. 420/591 |
| 2013/0136868 A1* | 5/2013 | Bruck et al. ................. 427/554 |
| 2013/0316183 A1* | 11/2013 | Kulkarni et al. ............ 428/557 |
| 2014/0209571 A1* | 7/2014 | Bruck et al. ................ 219/73.1 |

FOREIGN PATENT DOCUMENTS

| | | |
|---|---|---|
| DE | 102005025348 A1 | 12/2006 |
| EP | 1201772 A1 | 5/2002 |
| WO | 2006100556 A2 | 9/2006 |

* cited by examiner

*Primary Examiner* — Scott Kastler

(57) ABSTRACT

An apparatus (20, 21) and method (80) operable to: feed (82) a granulated feedstock (26) into a chamber (22); apply (84) a melting or sintering energy (28) in programmable scans (30) producing a material deposit (32) overlaid with slag (34) in the chamber (22); position (86) a slag removal device (40, 52) such that its cutting surface (35) is coincident with a top surface (33) of the material deposit; cut or break the slag free (88) from the material deposit with the slag removal device; separate (92) the removed slag from a reusable portion of the granulated feedstock in a separator (42); and feed (94) the reusable portion of the granulated feedstock to the top surface of the material deposit for repeating (96) the above operations.

9 Claims, 6 Drawing Sheets

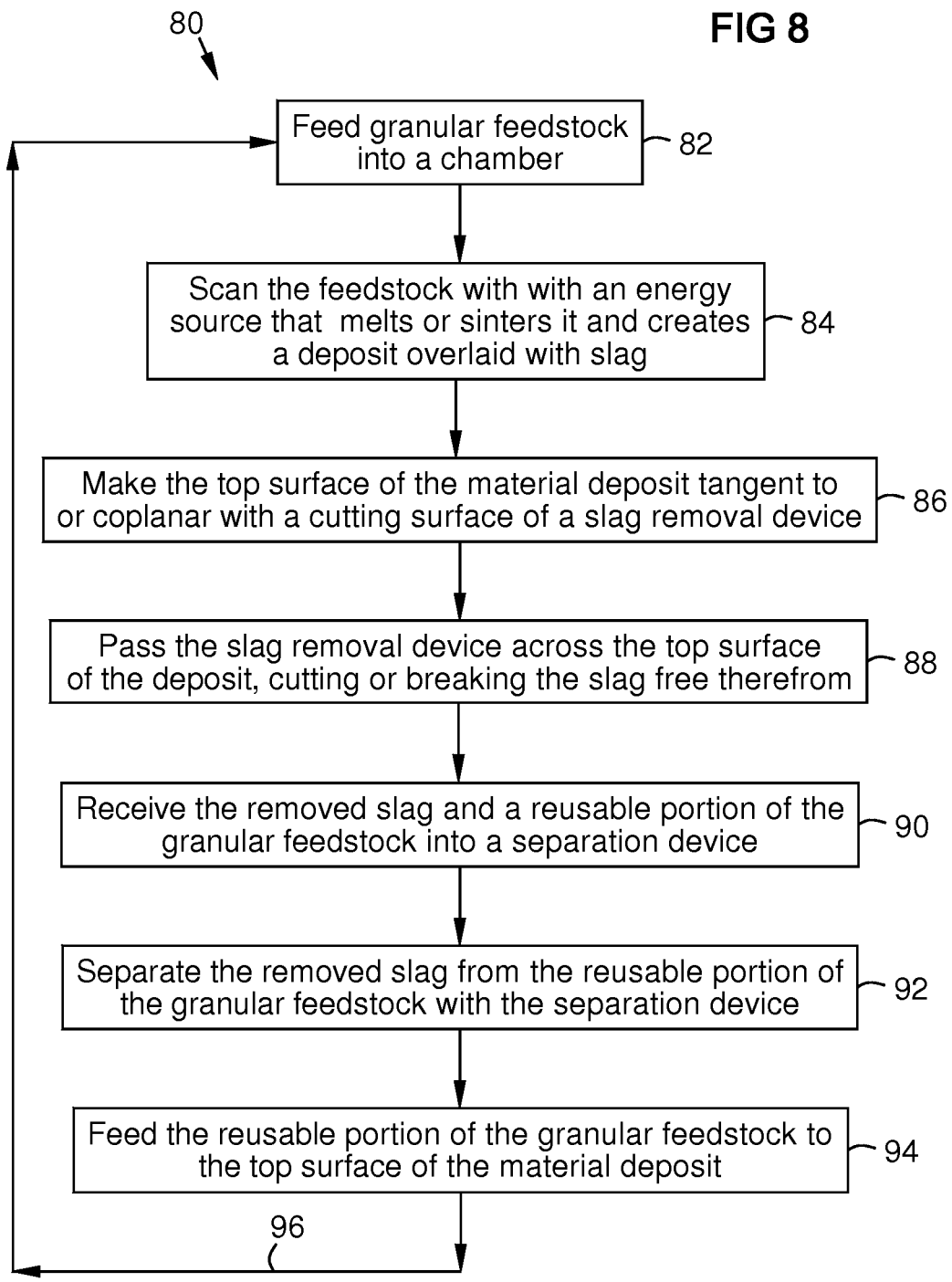

SLAG REMOVAL APPARATUS AND METHOD

FIELD OF THE INVENTION

The invention relates generally to welding and materials joining technologies, and more particularly to machines and processes for slag removal after selective laser melting or sintering of granulated feedstocks.

BACKGROUND OF THE INVENTION

Melting and sintering processes often produce a slag overlay. Slag removal can be challenging, especially when the metal or other material being formed must be successively layered to form a repair, cladding, or layered fabrication. Manually removing slag between each layer is slow and unproductive.

Submerged arc welding (SAW), electroslag welding (ESW), selective laser melting (SLM) and selective layer sintering (SLS) have been used to produce welds, cladding, and parts by additive manufacturing. In submerged arc welding a granulated flux buries an arc between an electrode wire or strip and a substrate to protect the molten material from reaction with the atmosphere. The process leaves slag on the surface of the metal deposit that must be removed before subsequent welding passes are made over or beside the existing deposit. The slag is manually removed, and unused granulated flux is vacuumed and combined with new flux for further processing. This process is also used for submerged arc cladding. Electroslag welding or cladding avoids an arc by providing molten flux at the point of processing as a current conductor. Other processing technologies include laser cladding and selective laser melting (SLM) or selective laser sintering (SLS) of feedstock powder.

Vacuuming can be employed in submerged arc welding to recover both slag and unused flux if the slag is readily dislodged from the deposit surface. However, when physical engagement is required to dislodge the slag, vacuuming is not enough. For powder bed processing (e.g. SLM, SLS), vacuuming tends to remove feedstock powder together with, or in preference to, slag because the powder is lighter and is not adhered to the substrate. Not only does this fail in slag removal, but it removes unused feedstock needed for additional melting/sintering passes on or beside the previous deposit.

BRIEF DESCRIPTION OF THE DRAWINGS

The invention is explained in the following description in view of the drawings that show:

FIG. 8 illustrates steps in a method operable by the disclosed machine.

DETAILED DESCRIPTION OF THE INVENTION

Figure 1:
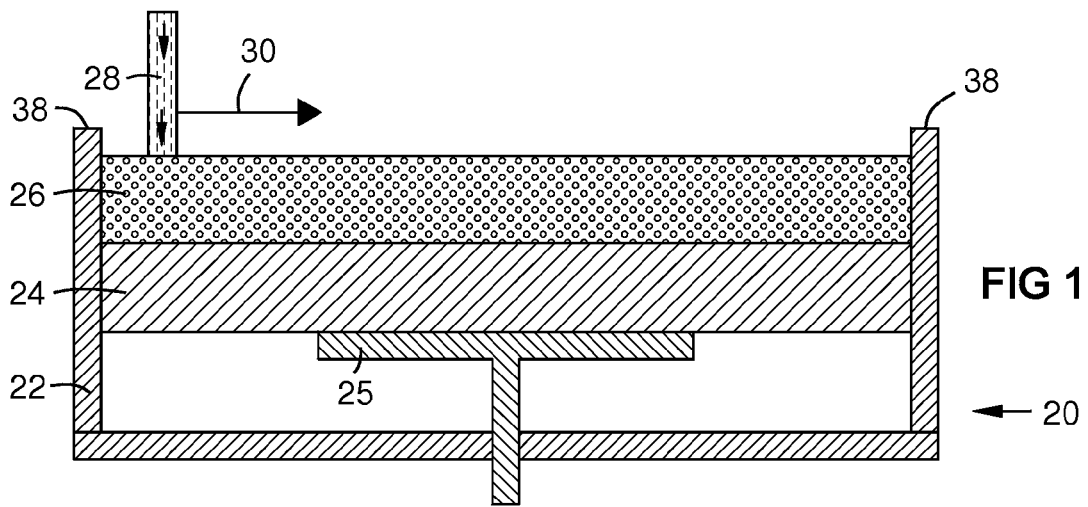
FIG. 1 is a schematic sectional view of a chamber containing a substrate overlaid with a granular feedstock for processing according to an embodiment of the invention.

FIG. 1 shows a machine 20 with a melting chamber 22 surrounding a component or substrate 24 for repair, cladding, welding, or fabrication. The chamber may have an upper rim 38, which may be planar or curved, and may guide a slag removal device as later described. A movable positioner 25 may support the substrate 24 and move it vertically relative to the chamber 22. A granular feedstock 26 is disposed on the substrate 24 for melting or sintering by an energy source 28 such as a laser. The energy source 28 may move across the feedstock 26 in a programmable path 30 to melt or sinter the granular material 26, which may include alloy constituents and flux. For example, a laser beam may be directed to scan a programmable path 30 by means of movable mirrors or prisms to "paint" a predetermined area of the feedstock 26 with laser energy for heating. The feedstock 26 may be any type or combination of materials that can be melted or sintered to form a solid layer or body with a layer of slag thereon.

Figure 2:
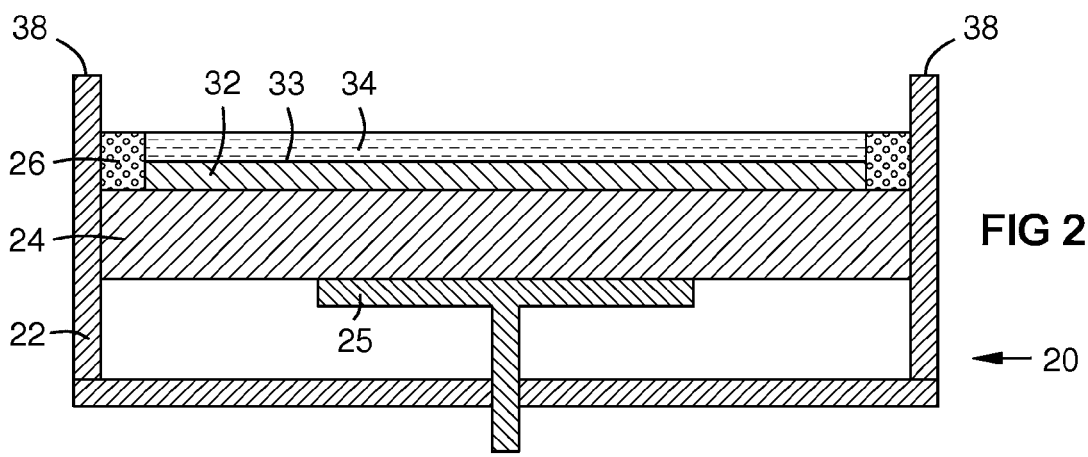
FIG. 2 is a view of the machine of FIG. 1 after melting or sintering of the feedstock has formed a material deposit overlaid with slag on the substrate.

FIG. 2 shows a deposit 32 formed on the substrate 24 by melting or sintering of the feedstock 26. A slag layer 34 is formed on an upper surface 33 of the deposit 32.

Figure 3:
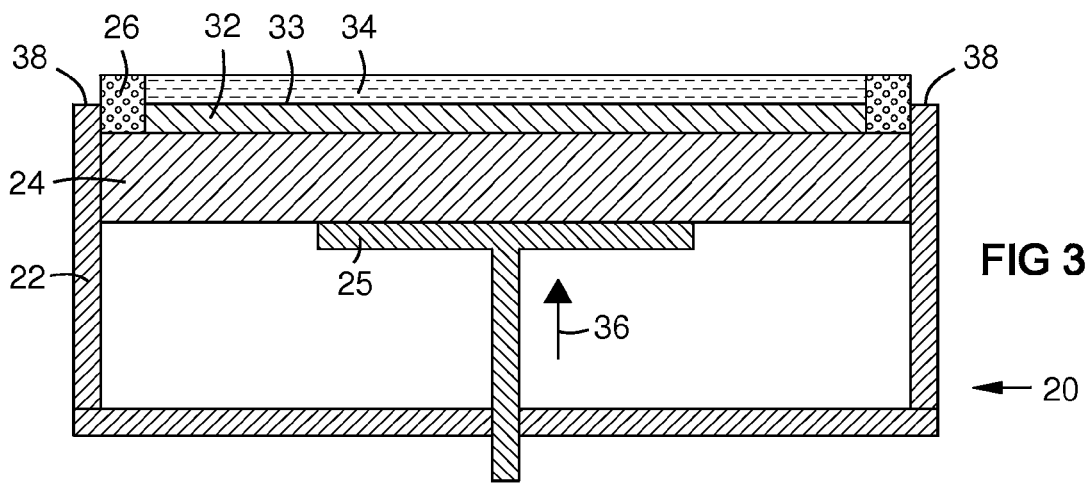
FIG. 3 is a view of the machine of FIG. 1 repositioning the slag layer above a rim of the chamber for slag removal.

FIG. 3 shows the substrate raised 36 by the positioner 25 so that, for example, the top surface of the deposit 32 is flush with the rim 38 of the chamber 22.

Figure 4:
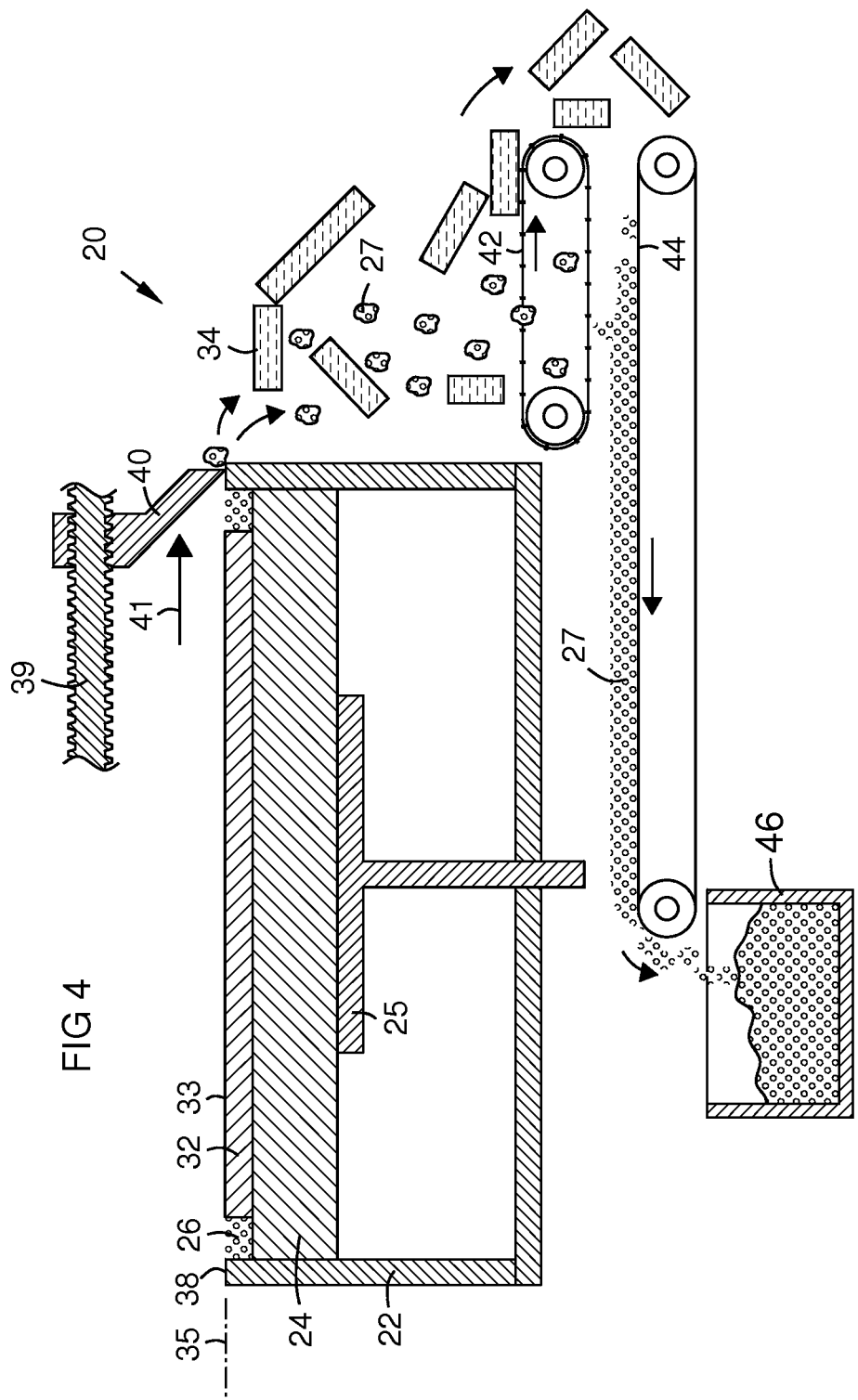
FIG. 4 is a view of a slag removal device disposed on the chamber of FIG. 1 and raking slag from the material deposit and onto a separator that separates slag from reusable granular feedstock.

FIG. 4 shows a slag removal device 40, exemplified as a scraper, mounted on a drive mechanism 39, exemplified by a screw that moves the slag removal device across the top surface of the deposit 32. This removes the slag 34 above a cutting surface 35 of the slag removal device 40. Herein, "cutting surface" means a surface geometry, such as a plane or a surface of rotation, beyond which the slag removal device removes material during relative motion between the deposit 32 and the slag removal device 40. The top surface 33 of the deposit 32 has been positioned at the cutting surface 35, so that the slag 34 is removed. Also removed is at least a portion of reusable feedstock 27 remaining above the level of the upper surface 33 of the deposit. A separation device 42 may be provided that separates the slag from the reusable feedstock based on particle size or other criteria. This separation may be implemented for example by a perforated conveyor belt, a shaker screen, or a vibratory sieve. A conveying device 44 may transfer the recovered feedstock 27 to a collector 46, or the collector may be directly filled by the separation device 42.

The slag removal device 40 may be embodied especially by a device such as a scraper or planer, which may optionally be embodied as a rotating cylinder with tines or blades, for example a rotary planer head. A preferred type of slag removal device breaks or cuts the slag free from the deposit, and breaks the slag 34 into pieces larger than a maximum size of granules of the reusable feedstock 27 for ease of separation therefrom. The slag removal device 40 may be guided by the upper rim 38 of the chamber after positioning the upper surface of the deposit flush with the rim 38 or flush with the cutting surface 35, which may be coplanar with the rim 38 as shown.

Figure 5:
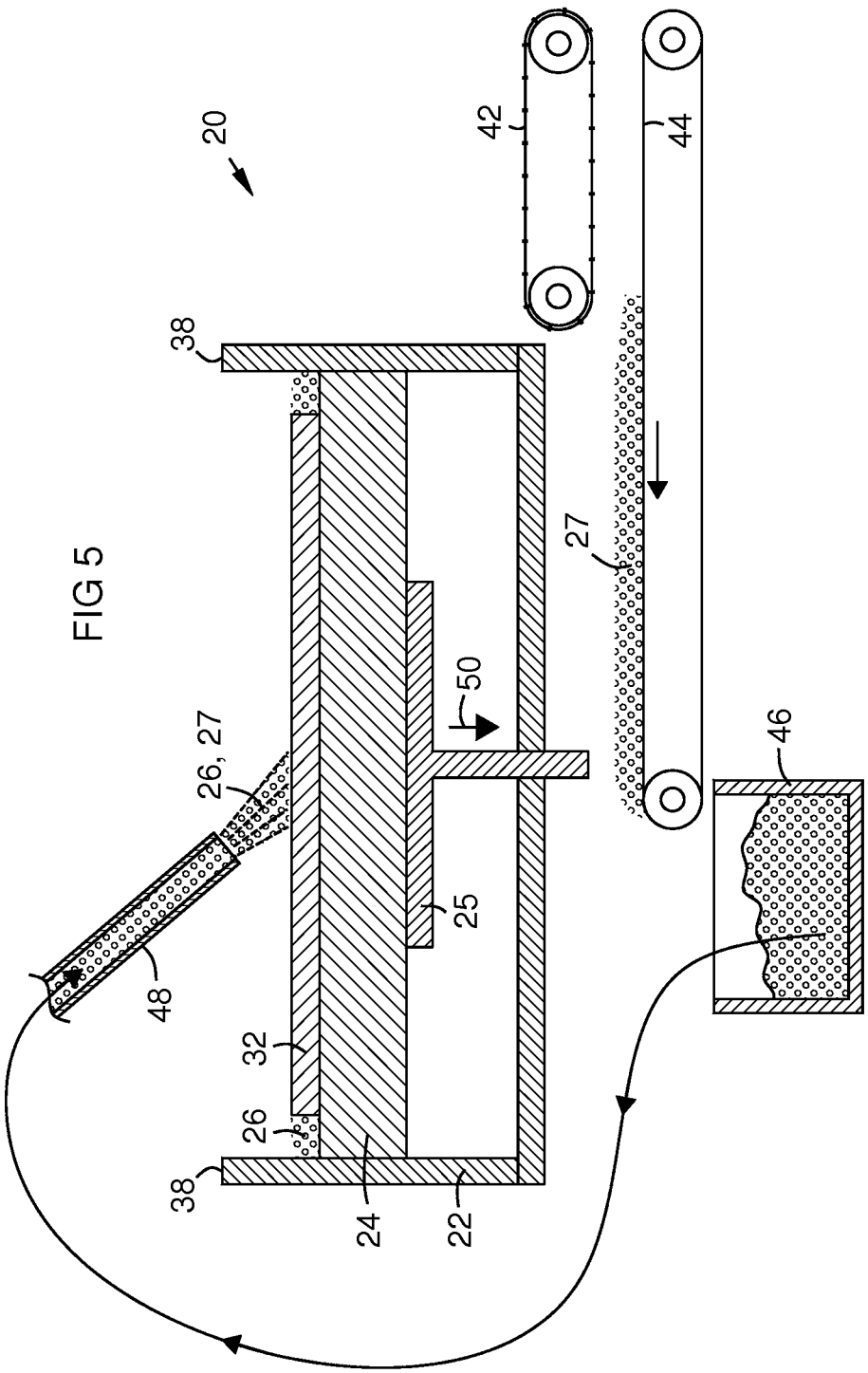
FIG. 5 is a view of the machine of FIG. 4 recycling the recovered feedstock to a top surface of the material deposit for further layering or cladding.

FIG. 5 shows a feedstock feeder 48 distributing recovered feedstock 27 along with new feedstock 26 on the deposit 32 to create a further deposit thereon by further scans 30 of the energy source 28 of FIG. 1. The positioner 25 may lower 50 the substrate 24 so that the chamber rim 38 retains the further layer of feedstock 26, 27.

Figure 6:
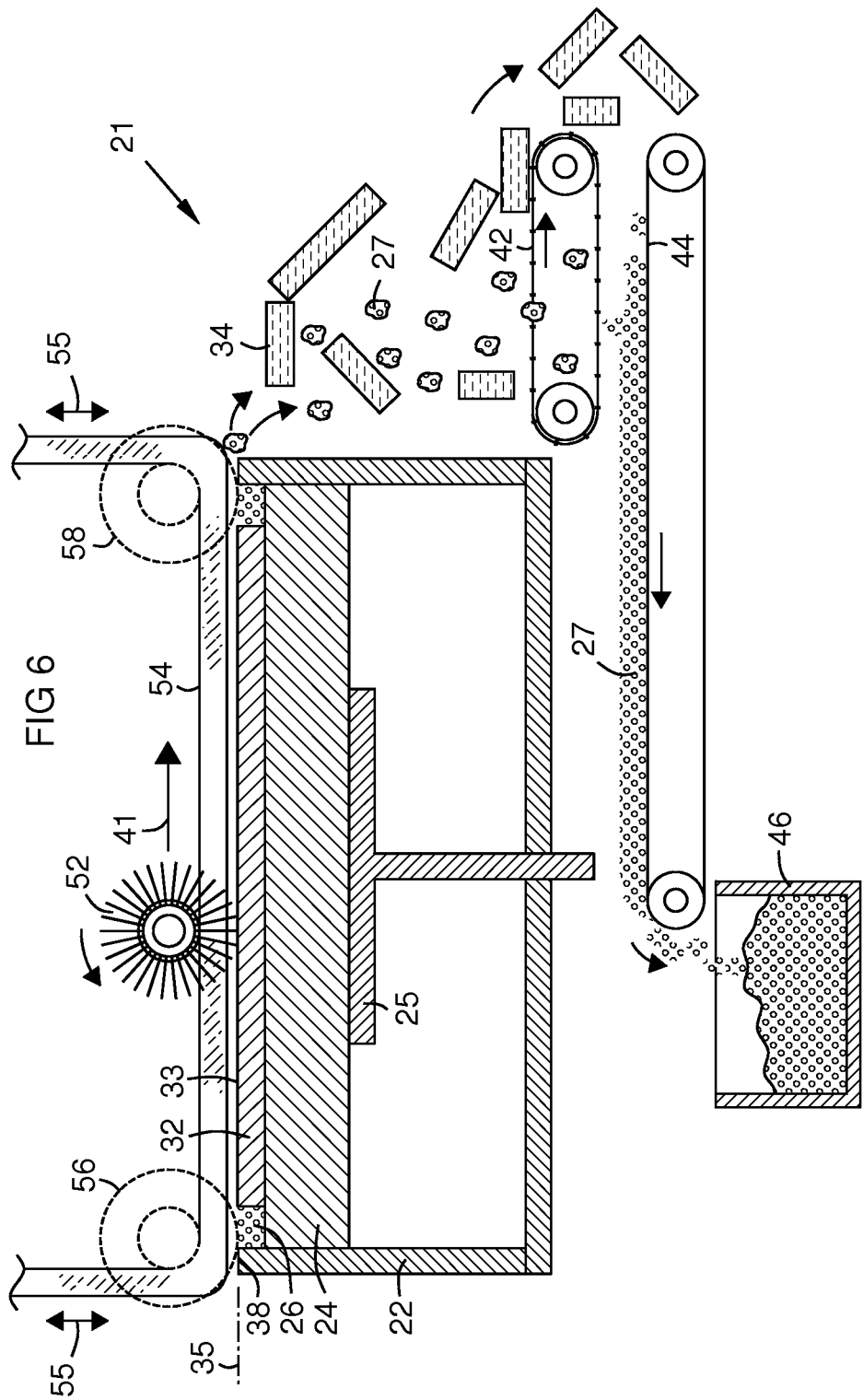
FIG. 6 is a view of an embodiment of the invention with a vertically adjustable rotary slag removal device.

FIG. 6 shows an embodiment 21 with a rotary brush or blade 52 moving on a guide track 54 from a starting position 56 to an ending position 58 to remove slag 34 and reusable feedstock 27 at and above the level of the upper surface of the deposit. The guide track 54 may be vertically adjustable 55 to position the cutting surface 35 at the upper surface 33 of the deposit 32. In this embodiment, the cutting surface 35 is approximately or exactly tangent to the surface of rotation of the rotary brush or blade. The cylindrical rotary brush or blade 52 may be embodied with wire bristles, tines, or as a planer head.

The slag removal device 40, 52 may be mounted on or moved by a drive mechanism, especially a position translating mechanism such as a motor-driven chain or screw drive or a motor-driven or hydraulic piston. The drive mechanism may include or operate against a guiding device, such as a track 54 or the chamber rim 38 that guides the slag removal device to move along a predetermined cutting surface 35 relative to the chamber 22.

A machine 20, 21 configured with apparatus herein, includes for example a chamber 22, a feedstock feeder 48, an energy source 28 with programmable scanning 30, a slag removal device 40 or 52, a drive mechanism 39, and a separation device 42. It may be controlled automatically by an electronic process controller to perform slag removal and separation as described. Such machine is operable to automatically repair or clad a substrate with one or more layers of material deposits, and to automatically remove slag after each deposit. Controllers, motors, actuators, and interconnections for machine automation are not shown in the drawings since such elements are known in the field of process automation and controls.

Figure 7:
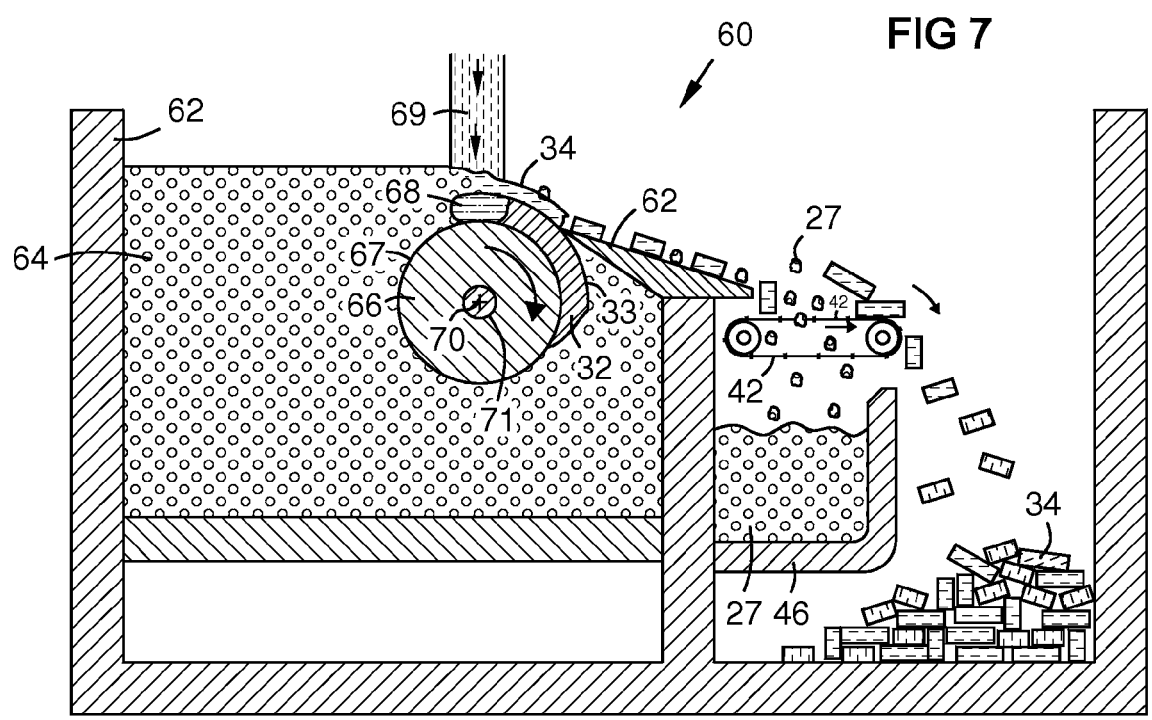
FIG. 7 shows an embodiment that rotates a component being repaired, welded, layered, or fabricated.

FIG. 7 shows an embodiment 60 with a feedstock chamber 62 containing a feedstock 64, which may granular and/or in a liquefied or fluidized form. A component 66 for repair, cladding, or welding, or fabrication, or more generally, a form for fabrication, is positioned to receive a flow of the feedstock 64 on a surface 67 thereof. The component 66 is rotated by a drive mechanism 71 relative to an energy source 69 such as a laser. The energy source 69 may be stationary, or it may move across the component 66 in a programmable path to melt or sinter the granular material 64, which may include alloy constituents and flux. For example, a laser beam may be directed to scan a programmable path back and forth along a rotation axis 70 of the component 66 as the component rotates. The energy source 69 forms a localized melt pool 68 on the component surface 67 from which a deposit 32 is drawn on the surface 67 as it rotates under the melt pool. As the deposit 32 hardens with a slag 34 overlay, it rotates under a slag removal device 62 such as a stationary scraper or cutter as shown, or a moving device such as a rotary device as previously shown. Removed reusable feedstock 27 may be separated from the removed slag 34 as previously described.

FIG. 8 illustrates a method 80 operable by the disclosed machine. The method 80 may be implemented by control logic in software or hardware to execute the below steps and/or subsets thereof as claimed. The steps may include:

82 Feed a granular feedstock material into a chamber;

84 Scan the feedstock with an energy source that selectively melts or sinters the feedstock to create a material deposit overlaid with slag;

86 Position the top surface of the material deposit at a cutting surface of a slag removal device, or position the cutting surface of the slag removal device at the top surface of the material deposit;

88 Pass the slag removal device across the top surface of the deposit or move the deposit relative to the slag removal device, cutting or breaking the slag free from the top surface;

90 Receive the removed slag and a reusable portion of the granular feedstock into a separation device;

92 Separate the removed slag from the reusable portion of the granular feedstock with the separation device;

94 Recycle the reusable portion of the granular feedstock to the top surface of the material deposit; and 96 Repeat one or more times from step 82.

While various embodiments of the present invention have been shown and described herein, it will be obvious that such embodiments are provided by way of example only. Numerous variations, changes and substitutions may be made without departing from the invention herein. Accordingly, it is intended that the invention be limited only by the spirit and scope of the appended claims.

The invention claimed is:

1. A method comprising:
    forming a solid layer of a material on a substrate by heating a granulated feedstock wherein a slag layer is formed on a top surface of the solid layer;
    removing the slag from the solid layer and a reusable portion of the feedstock from the substrate with a slag removal device mounted on a drive mechanism that moves the slag removal device relative to the top surface of the solid layer;
    adjusting a depth of removal of the slag relative to the top surface of the solid layer, wherein the slag removal device breaks or cuts the slag free from the solid layer, and breaks the slag into pieces larger than a maximum granule size of the feedstock;
    collecting the removed slag and the reusable portion of the feedstock into a separating device; and
    separating the removed slag from the reusable feedstock with the separating device.

2. The method of claim 1, wherein the slag removal device comprises a scraper or planer.

3. The method of claim 1, further comprising:
    providing a chamber that surrounds the solid layer; and
    providing a positioner that supports the solid layer and positions it vertically in the chamber, providing an adjustable depth of removal of the slag.

4. The method of claim 3, further comprising:
    positioning the top surface of the solid layer flush with a top rim of the chamber; and
    guiding the slag removal device with the top rim of the chamber to move the slag remove device across the top surface of the solid layer.

5. The method of claim 1, wherein the drive mechanism comprises a guide track with an adjustable vertical position relative to the top surface of the solid layer, and further comprising guiding the slag removal device with the guide track to move the slag removal device across the top surface of the solid layer.

6. The method of claim 1, wherein the slag removal device comprises a rotating scraper or planer, and the drive mechanism comprises a vertically adjustable track; and further comprising guiding the slag removal device with the guide track to move the slag removal device across the top surface of the solid layer.

7. An apparatus comprising:
- a slag removal device operable to cut or break slag free from a top surface of a solid layer;
- wherein the slag removal device comprises a scraping or planing device operable to break the slag into pieces larger than a maximum granule size of the reusable feedstock material;
- a positioner operable to position the top surface of the solid layer at a cutting surface of the slag removal device
- a drive mechanism operable to mechanically move the slag removal device relative to the top surface of the solid layer;
- wherein the drive mechanism is guided by an upper rim of a chamber containing the solid layer to move the slag removal device along the top surface of the solid layer; and
- a separation device configured to receive a slag material and a reusable portion of a feedstock material from the slag removal device, and operable to separate the slag material from the reusable feedstock material.

8. A method comprising:
- forming a solid layer of a material on a substrate by heating a granulated feedstock wherein a slag layer is formed on a top surface of the solid layer;
- removing the slag from the solid layer and a reusable portion of the feedstock from the substrate with a slag removal device mounted on a drive mechanism that moves the slag removal device relative to the top surface of the solid layer;
- collecting the removed slag and the reusable portion of the feedstock into a separating device; and
- separating the removed slag from the reusable feedstock with the separating device;
- wherein the top surface of the solid layer is curved, and the drive mechanism rotates the top surface of the solid layer against the slag removal device.

9. The method of claim 8, wherein the drive mechanism rotates a form that receives a flow of the granulated feedstock on a surface of the form, and said flow is heated by an energy source creating a melt pool on the surface of the form from which the solid layer is drawn on the surface of the form by the rotation of the form.

* * * * *